UNITED STATES PATENT OFFICE.

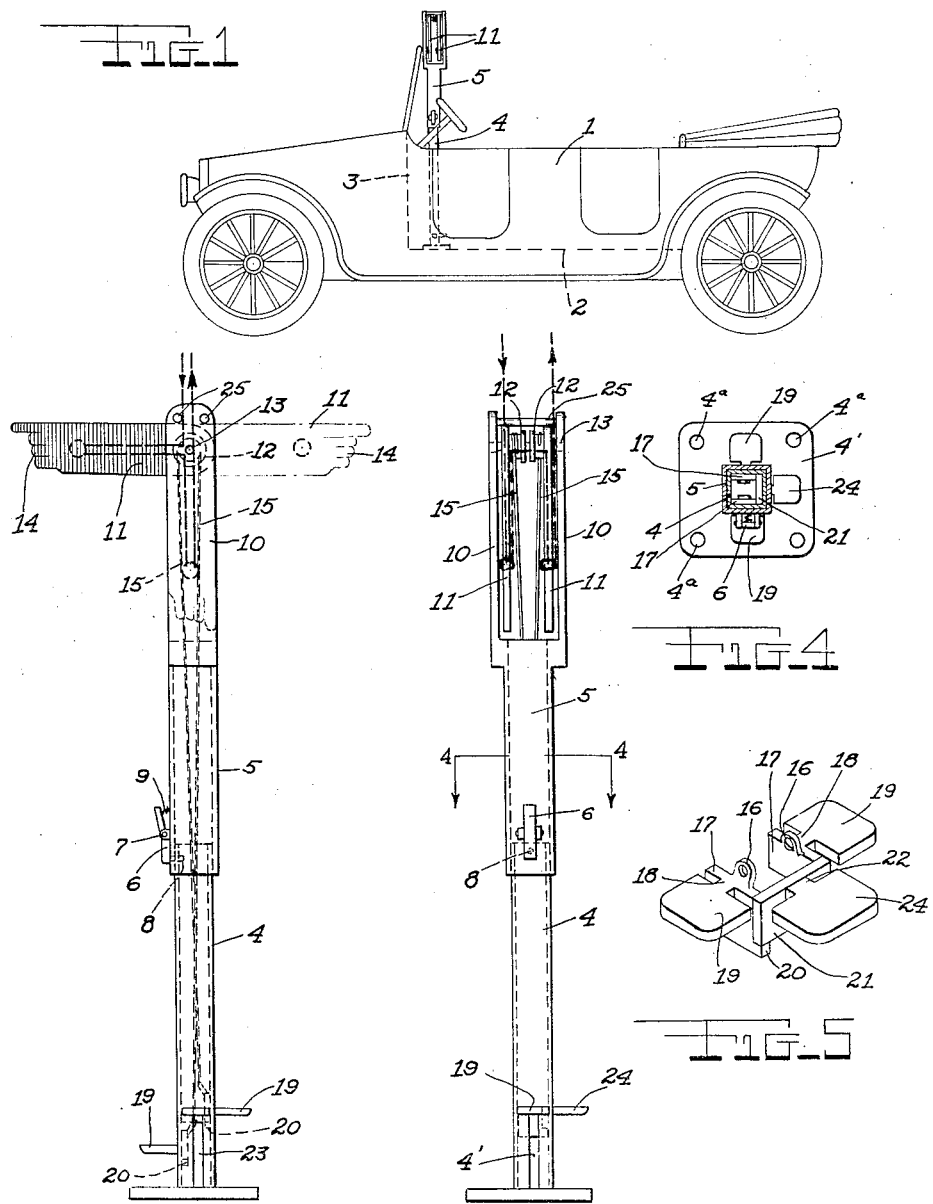

JULIAN KAZIENKO, OF ROSEBANK, NEW YORK.

AUTOMOBILE TURN-INDICATING DEVICE.

1,353,964.  Specification of Letters Patent.  Patented Sept. 28, 1920.

Application filed January 13, 1920. Serial No. 351,195.

*To all whom it may concern:*

Be it known that I, JULIAN KAZIENKO, a citizen of Poland, residing at Rosebank, county of Richmond, and State of New York, have invented certain new and useful Improvements in Automobile Turn-Indicating Devices, of which the following is a specification.

This invention relates to an automobile turn and stop signal by which the driver of an automobile may readily give notice to approaching or following vehicles of his intention to stop or to turn to either right or left.

The invention has for an object to provide a simple and inexpensive device of this kind which may be readily installed in any automobile, and which may be readily adjusted to position it so as to be readily observable when in use or to a compact and unobtrusive form when not in use.

For further comprehension of the invention, and of the objects and advantages thereof, reference will be had to the following description and accompanying drawings, and to the appended claims in which the various novel features of the invention are more particularly set forth.

Figure 1 of the drawings is a side view of an automobile having my improved signaling device applied thereto.

Fig. 2 is a face view of the device alone.

Fig. 3 is a side view thereof.

Fig. 4 is a horizontal section on the line 4—4 of Fig. 3.

Fig. 5 is a detail perspective view showing the construction and relative arrangement of the operating pedals.

In the drawings 1 indicates generally an automobile of ordinary construction, the floor and dashboard thereof being indicated by the dotted lines 2 and 3. My improved device is adapted to be fixed on this floor preferably just to the rear of the dashboard so as to be easily operated by the driver.

The device comprises a hollow rectangular telescoping standard made up of the lower section 4 and upper section 5, the lower section projecting into the upper section and having a foot or base 4' provided with holes 4ª, whereby it may be fixed in position. The upper section is supported in its raised position by means of a detent 6 pivoted as at 7 on the upper  ndard section 5 and carrying a pin 8 adapted to project through registering apertures in the walls of the two sectons, a spring 9 bearing between the detent and the side of the section 5, normally pressing the pin into the said apertures.

The upper end of the section is in the form of a pair of spaced legs 10 between which the indicating or signaling members are mounted. These indicating members comprise a pair of similar arms 11 which are fixed at their inner ends to drums 12 loosely mounted on a stub shaft 13 extending between the upper ends of the legs 10, these arms preferably having their outer ends in the form of hands 14.

A pair of ropes 15 are secured at their upper ends to the drums 12 passing respectively in opposite directions thereover so that upon the ropes being pulled the drums will be rotated in opposite directions. These ropes pass downward through the hollow standard and are attached at their lower ends to eyes 16 formed on plates 17 slidably held on opposite walls of the lower section 4 of the standard, these plates having combined with them foot pedals which serve both to pull on the ropes and hold the plates in position. As here shown the plates 17 have narrow neck-like projections 18 on their outer faces which extend through slots 4' in the opposite walls of the lower standard section and are formed with the rigid pedal members 19 whose inner faces project across the outer faces of the section 4 and so retain the plates slidably in position.

These plates are each formed with a laterally projecting lug 20 at one end, these lugs 20 projecting under opposite ends of a third plate 21 also slidable within the section 4 and having a neck 22 projecting through a slot 23 in the section and formed with a fixed foot pedal 24. The upward movement of the arms 11 is limited by a pair of pins 25 which extend between the upper ends of the lugs 10 and are engaged by the arms when the latter reach a horizontal position.

It is believed that the manner of use of my improved signaling device will be apparent from the above description. The weight of the signal arms 11 will normally overbalance the foot pedals so that the arms will hang downwardly between the legs 10 as indicated in dotted lines in Fig. 2 and in full lines in Fig. 3. Should it be desired to indicate a turn to the left the proper pedal will be depressed by the driver's foot throwing the arms to which it is connected upward to the position shown in full lines in Fig. 2. To indicate a turn to the left the opposite pedal is depressed throwing the other arm upward to the dot and dash line position indicated in Fig. 2. To give a stop signal the pedal 24 is depressed, and since the ends of the plate 21 to which it is fixed engage the lugs 20 on the plates 17 the latter will also be depressed, moving both arms to the horizontal position.

When the device is not being used the pin 8 may be drawn back allowing the upper section of the standards to slide down over the lower one.

Having thus described my invention what I claim as new and desire to secure by Letters Patent, of the United States is as follows:

1. An automobile signaling device comprising a hollow standard, a pair of arms hinged to the upper end thereof, the lower end of said standard being vertically slotted on three sides, a pair of plates disposed within the standard adjacent opposite slotted sides thereof, necks on said plates projecting through the adjacent slots in the standard, pedal members fixed on said necks and bearing slidably on the outer surface of the standard, projections on said plates, a third plate disposed in the standard adjacent the third slotted side thereof and resting on the said projections, a neck on said third plate projecting through the adjacent slot in the standard, a pedal member fixed on said neck and bearing slidably on the outer surface of the standard, and operative connections between the first mentioned pair of plates and the said arms.

2. An automobile signaling device comprising a hollow standard, a pair of arms hinged to the upper end thereof, the lower end of said standard being vertically slotted on the sides, a pair of plates disposed within the standard adjacent opposite slotted sides thereof, necks on said plates projecting through the adjacent slots in the standard, pedal members fixed on said necks and bearing slidably on the outer surface of the standard, projections on said plates, a third plate disposed in the standard adjacent the third slotted side thereof and resting on the said projections, a neck on said third plate projecting through the adjacent slot in the standard, a pedal member fixed on said neck and bearing slidably on the outer surface of the standard, and operative connections between the first mentioned pair of plates and the said arms, said connections comprising drums upon which the said arms are fixed, and ropes connecting said drums and plates.

3. An automobile signaling device comprising a hollow telescopic standard having its upper end in the form of a pair of spaced legs, and having its lower end vertically slotted on three sides, a pair of drums pivoted between the upper ends of said legs, a pair of signal arms fixed on the respective drums, a pair of rods extending between the said legs and limiting upward movement of the said arms, a pair of ropes connected at one end to the respective drums and winding respectively in opposite directions thereover, a pair of plates disposed within the standard adjacent opposite slotted sides thereof, said ropes passing downward through the standard and being connected at their lower ends to said plates, a third plate adjacent the third slotted side of the standard and resting freely upon the first two plates, each of said plates having a neck formed thereon projecting through the adjacent slot in the standard, and a foot pedal fixed on the outer end of each of said necks.

In testimony whereof I have affixed my signature.

JULIAN KAZIENKO.